UNITED STATES PATENT OFFICE.

RAYMOND F. BACON AND BENJAMIN H. NICOLET, OF PITTSBURGH, PENNSYLVANIA, ASSIGNORS TO ACME MANUFACTURING COMPANY, OF CHICAGO, ILLINOIS, A CORPORATION OF WEST VIRGINIA.

MANUFACTURE OF CATALYSTS.

1,152,591.      Specification of Letters Patent.      Patented Sept. 7, 1915.

No Drawing.      Application filed November 4, 1914. Serial No. 870,190.

*To all whom it may concern:*

Be it known that we, RAYMOND F. BACON and BENJAMIN H. NICOLET, both citizens of the United States, residing at No. 4909 Forbes street and No. 257 Atwood street, respectively, in the city of Pittsburgh, Allegheny county, State of Pennsylvania, have invented certain new and useful Improvements in the Manufacture of Catalysts; and we do hereby declare the following to be a full, clear, and exact description of the invention, such as will enable others skilled in the art to which it appertains to make and use the same.

This invention relates to the manufacture of a catalyst for the hydrogenation of fatty acids or their glycerids.

The invention consists in impregnating an inert, porous supporting material or carrier, preferably pulverulent, such as kieselguhr, powdered pumice, fullers'-earth, or the like, with a precipitant for a nickel salt. Such precipitant may be, for instance, any suitable soluble hydroxid or carbonate, such as sodium hydroxid, and, in accordance with the invention, it will likewise be associated with a small quantity of a substance which will give a bulky precipitate simultaneously with the precipitation of the nickel salt. This supplemental substance may be, for example, sodium aluminate, and the bulky precipitate therefrom will in such case be aluminum hydroxid. To the support or carrier thus impregnated with the precipitant for nickel and the supplemental precipitant, is added a solution of an appropriate soluble nickel salt, as, for instance, the nitrate. Thereupon, the nickel salt is precipitated as nickel hydroxid by the sodium hydroxid or its equivalent upon and within the catalyst. At the same time, there is simultaneously precipitated the supplemental bulky material by the decomposition of the sodium aluminate. This supplemental bulky material (in this case, aluminum hydroxid) further increases the surface of exposure of the catalyst. The impregnated support or carrier is then washed to remove any injurious soluble products that may be present, and is thereafter dried and the insoluble nickel salt reduced to catalytically active nickel, at a temperature which preferably should not exceed a range of from 350° C. to 450° C. and with a duration of treatment of from one to two hours. It is evident that the solution of the nickel salt might have been absorbed by the support, and the product so obtained made to react with the solution of aluminate and other precipitant, but in that case, such action would have been less effective.

While, as hereinbefore indicated, we prefer to employ pulverulent material as the support or carrier for the nickel salt, we may likewise employ a support or carrier of larger grain, the feasible size of the particles depending upon the facilities at hand for bringing about a satisfactory changing contact, in the hydrogenating operation, between the fatty material, the hydrogen and the particles of the catalyst. The term "finely divided", as employed in the claims, is intended, therefore, to include not only a pulverulent carrier, but also one of such larger grain or size as it is feasible to maintain in suspension in the fatty material during hydrogenation.

As an example of the manner of carrying out the process described, 100 lbs. of the desired carrier, say pumice stone in small fragments, is impregnated with a solution containing 65 lbs. sodium hydroxid, and sodium aluminate equivalent to 5 lbs. aluminum oxid; the precipitating solution containing 165 lbs. crystallized nickel nitrate. The product is filtered, washed to remove soluble salts, or most of them, and reduced for two hours, preferably between 350° C. and 450° C. The catalyst made as described should contain about 25% nickel, and about 5% pulpy aluminum oxid.

What we claim is:

1. The method of producing a catalyst for the hydrogenation of fatty acids or their glycerids, which consists in impregnating a finely divided carrier with a precipitant for a nickel salt, and a salt for simultaneously precipitating in the carrier a supplemental bulky material, then adding a nickel salt solution, whereupon the desired precipitation of an insoluble nickel salt is obtained together with the desired precipitation of the bulky supplemental constituent, and finally reducing the insoluble nickel salt to a catalytically active state; substantially as described.

2. The method of producing a catalyst for the hydrogenation of fatty acids or their glycerids, which consists in impregnating a finely divided carrier with sodium hydroxid and sodium aluminate, then adding a solution of nitrate of nickel, whereupon the nickel will be precipitated as nickel hydroxid, and the aluminum as aluminum hydroxid, and finally reducing the nickel hydroxid to a catalytically active state; substantially as described.

In testimony whereof we affix our signatures, in presence of two witnesses.

RAYMOND F. BACON.
BENJAMIN H. NICOLET.

Witnesses:
R. R. SHIVELY,
J. F. CHANCE.